United States Patent [19]

Cranor et al.

[11] 4,358,662
[45] Nov. 9, 1982

[54] THERMALLY ISOLATED FUME EXHAUSTING ATTACHMENT FOR SOLDERING IRONS

[75] Inventors: Benny D. Cranor, Mesquite, Tex.; Robert C. Runyon, St. Louis, Mo.

[73] Assignee: Western Electric Company, Inc., New York, N.Y.

[21] Appl. No.: 168,950

[22] Filed: Jul. 11, 1980

[51] Int. Cl.³ .......................... H05B 1/00; B23K 3/00; A47L 9/02
[52] U.S. Cl. ...................... 219/230; 15/339; 15/415 R; 219/74; 219/137.41; 228/20; 228/57
[58] Field of Search ...................... 219/230, 74, 137.41; 15/339, 415 R; 98/115 R; 228/20, 21, 53, 52, 57

[56] References Cited

U.S. PATENT DOCUMENTS

| | | | |
|---|---|---|---|
| 1,871,009 | 8/1932 | Righter | 228/53 |
| 2,041,018 | 5/1936 | Persons | 219/230 X |
| 2,184,980 | 12/1939 | Smith | 228/20 |
| 2,522,482 | 9/1950 | Olzak | 219/74 |
| 3,689,732 | 9/1972 | Hill | 219/74 X |
| 3,798,409 | 3/1974 | Troyer et al. | 219/137.41 |
| 3,803,381 | 4/1974 | Bernard et al. | 219/74 |
| 3,838,240 | 9/1974 | Schelhorn | 219/230 X |
| 3,886,344 | 5/1975 | Frantzreb et al. | 219/137.41 |

FOREIGN PATENT DOCUMENTS

| | | | |
|---|---|---|---|
| 230252 | 11/1963 | Australia | 15/339 |
| 2440005 | 2/1975 | Fed. Rep. of Germany | 219/230 |
| 1526305 | 4/1968 | France | 219/137.41 |
| 644758 | 9/1962 | Italy | 219/230 |
| 1483257 | 8/1977 | United Kingdom | 219/230 |

OTHER PUBLICATIONS

"Design of a Solder Vapor Removal System" by Peter Hamiton, et al., Senior Engineering Design Project, Mechanical Engineering Department, University of Texas at Austin, Austin Texas, Aug. 4, 1978.

Primary Examiner—A. Bartis
Attorney, Agent, or Firm—R. P. Miller

[57] ABSTRACT

An electric soldering iron having an elongated heater barrel extending from a handle and a soldering tip projecting from the end of the barrel is provided with a thermally isolated fume exhausting attachment positioned coaxially of the barrel and surrounding the tip for withdrawing objectionable fumes, gases, smoke and other air-borne contaminants from the soldering site. The attachment includes a metallic shell having a forward hood portion, overlying the tip and forming a fume exhaust chamber connected to a vacuum source by an exhaust conduit including a flexible transparent plastic tube portion, and a rearward slotted clamping portion secured to the front end of the barrel by a clamping ring. A compressible thermally insulative sleeve of alumina silicate fibers is interposed between the clamping portion and the barrel for thermally insulating the attachment from the heated barrel to preclude burn injury to the user of the iron. The withdrawn fumes are initially cooled by mixing with ambient air in the hood portion and the fumes are further cooled during passage through the exhaust tube so that the temperature of the fume-air mixture is below the which would cause a burn should the exhaust conduit be contacted by the user. However, the temperature of the fume-air mixture is maintained at a sufficient level to minimize condensation and agglomeration of flux material on the walls of the exhaust conduit.

5 Claims, 5 Drawing Figures

THERMALLY ISOLATED FUME EXHAUSTING ATTACHMENT FOR SOLDERING IRONS

TECHNICAL FIELD

This invention relates to a fume exhausting attachment for a soldering iron, and more particularly to a device that may be readily attached to a soldering iron for vacuum exhausting and cooling rosin fumes produced at a soldering site during a soldering operation.

BACKGROUND OF THE INVENTION

In the electronic and electrical apparatus manufacturing industries, many diverse devices are interconnected by a solder connection. In some instances wire wrapped connections are further secured by the application of solder. These solder connections are generally made with the use of manual soldering irons and employ a solder in conjunction with a flux. Heating of the flux results in a generation of fumes and/or smoke which are usually objectionable to the solderer, and as a result the soldering operations are often performed under a hood connected to an exhausting system. Even with the use of exhaust hoods, the flux fumes rise from the soldering site and pass by the operator before being withdrawn by the exhaust system. With these types of hood exhaust systems a large amount of the ambient air is exhausted resulting in a severe drain on factory heating and air conditioning systems.

Several attempts have been made in the past to construct soldering irons with fume exhausting features, but these modified soldering irons have not been widely adopted. One such combination soldering iron with exhaust facilities is shown in U.S. Pat. No. 2,184,980 issued Dec. 26, 1939 to F. J. C. Smith, wherein a flared skirt is provided to surround the soldering iron tip. The flared skirt is connected to an exhaust system to withdrawn flux fumes along passageways that are closely adjacent to the heating elements and then the exhaust fumes pass through further passageways formed in the soldering iron handle, whereafter the fumes are drawn to a suction device. The hood is secured to the soldering iron with metallic screws which pass through a sleeve of asbestos, interposed between the iron and the hood, and are seated in threaded holes formed in a heated head.

In another type of construction, as shown in U.S. Pat. No. 2,041,018 issued May 19, 1936 to R. C. Persons, a soldering iron is provided with a suction pipe that runs through the soldering iron handle and terminates in a small hood positioned adjacent to the soldering iron tip. The hood and the suction pipe are clamped directly to heated parts of the soldering iron. This suction pipe is connected by a flexible conduit to a vacuum pump to effectuate the withdrawal of toxic fumes from the vicinity of the soldering iron tip.

In addition, fume extracting facilities have been incorporated in welding guns of the type disclosed in U.S. Pat. No. 3,798,409 issued Mar. 17, 1974 to W. E. Troyer et al. wherein shielding gas is passed through the gun and exited through a nozzle onto a welding site. The nozzle is axially spaced from an end of an outer shell to provide a radial or laterally outwardly extending exhaust passageway. The nozzle is electrically isolated from those portions of the gun that are energized. Shielding gas is passed through the nozzle and laterally dispersed and, then, withdrawn back toward the exhaust passageway by connecting the exhaust passageway to a vacuum pump.

SUMMARY OF THE INVENTION

The present invention contemplates, among other things, a simple, durable fume exhausting attachment for soldering irons which insures potentially objectionable fumes, gases, smoke or other air-borne contaminants, hereinafter identified as fumes, are withdrawn from a soldering site and passed through an exit tubular conduit. The arrangement is such that the heated fumes are cooled to such an extent in the exhaust system that there is no possibility of the using operator suffering a burn by touching the fume exhausting facilities adjacent to the soldering iron handle.

More particularly, the invention features a fume exhausting device that may be easily clamped to an existing barrel-type soldering iron to dissipate any fumes that may be generated at a soldering site. In a principal embodiment of the invention, a thermal insulating sleeve is placed about a forward section of a heated barrel and a shell of metal is placed over the sleeve so that a forward section forms a chamber about the soldering iron tip. The rearward end of the shell is slotted and a band is clamped about this end to force the slotted portions of the shell inwardly to compress the thermal insulating sleeve against the barrel. The sleeve may be constructed of alumina silicate, a material that does not flake or give off objectionable thermal decomposition products when heated and subjected to a moving heated air stream. The forward end of the shell supports one end of a heat conductive, metal tube having a second end connected by means of a flexible plastic tube to a vacuum source.

The modified soldering iron of the present invention is adapted to withdraw potentially noxious fumes from a soldering site, and substantially cool the fumes while passing through a conduit which may be positioned adjacent to the handle of the soldering iron. With this construction, several soldering irons may have exhaust facilities connected to a common vacuum pump. The modified soldering iron eliminates the need for exhaust hoods and, hence, substantially decreases the demands made on heating and air conditioning systems in areas where soldering operations are being performed.

BRIEF DESCRIPTION OF THE DRAWINGS

Other features and advantages of the present invention will be apparent upon consideration of the detailed specification and the drawings, wherein.

DETAILED DESCRIPTION

Figure 1:
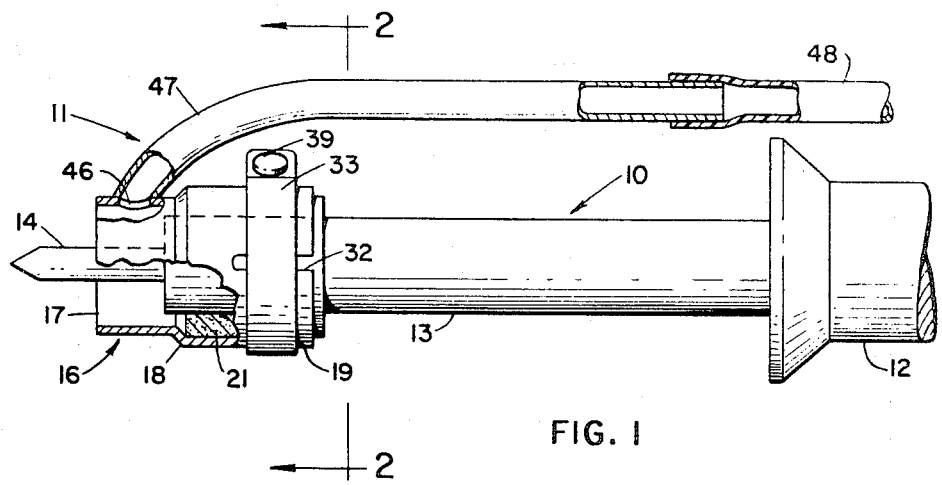
FIG. 1 is a side view partially in section showing a standard soldering iron modified with the exhaust facilities of the present invention.

Referring to FIG. 1, there is shown a commercial soldering iron 10 modified with an exhaust system attachment 11 for removing detrimental fumes produced at a soldering site. Soldering irons of this type are in widespread use, and are sold by a number of manufacturers, e.g., Model Nos. P 30, 30 H, P 34 and P 35 available from the Hexacon Electric Company of Roselle Park, N. J., and Model TC-201 available from the Weller Electric Corporation of Easton PA. In general, a soldering iron of this type includes a handle 12 constructed of wood or plastic or some other heat insulating material. An electric cord, not shown, passes through the handle to energize a heater unit contained in a forward portion of a barrel 13. The heater unit includes resistive elements that are energized to provide heat for a tip 14 constructed of good heat transfer metal.

In use, the operator will manipulate the handle 12 to move the tip to a soldering site to melt a glob of solder together with a flux. The flux has as one of its principal constituents a rosin or other thermally degradable constituents which, when heated, vaporizes and forms objectionable fumes which will be dissipated by the use of the exhaust attachment 11 forming the subject matter of the present invention. More particularly, the attachment 11 includes a shell 16 constructed of stainless steel or other durable metal having good thermal conductivity characteristics. The shell may be drawn or otherwise fabricated to provide a hood section 17 which surrounds the tip 14 in spaced relation, a shoulder section 18, and an enlarged clamping section 19. The length of the hood section 16 is dimensioned so that the tip 14 projects a sufficient distance to enable the operator to view the tip and the soldering site during a soldering operation. As an alternative, the lower section of the hood section 14 may be cut back along a beveled line 20 (see FIG. 4) to enhance the maneuverability and visibility of the tip at the soldering site. By providing such a beveled construction, the operator is also provided with an enlarged view of the soldering site.

Figure 3:
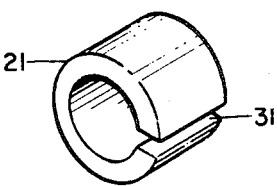
FIG. 3 is a perspective view of a thermal insulating sleeve that is interposed between the exhaust facilities and the soldering iron.
Figure 4:
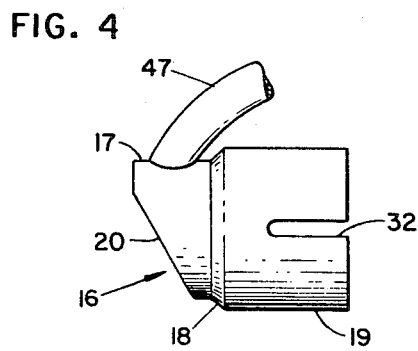
FIG. 4 is a side view of a modified exhaust shell forming a part of the fume exhaust facilities.

The shell 16 is supported on a sleeve 21, see also FIGS. 3 and 4, constructed of material that possesses good thermal insulating properties. In the principal embodiment of the invention, it is contemplated to construct the sleeve from layers of a woven mat formed by alumina silicate fibers. The alumina silicate fibers are bonded together with a binder which does not burn or thermal degrade or emit noxious fumes when subjected to the high heats encountered in a soldering operation. The fibrous materials mixed with the binder are pressed together and then rolled into the sleeve-like configuration. A bound alumina silicate material of this type may be obtained from Coors Porcelain Company of Golden, Colorado.

The sleeve 21 is fabricated with an inner diameter approximating the outer diameter of the barrel 13 and an outer diameter approximating the inner diameter of the clamping section 19 of the shell 16. The sleeve is compressible but in order to facilitate added compression it may be provided with one or more longitudinal slots 31 as shown in FIG. 3. The slot permits a compression of the sleeve to permit easy insertion within the shell. The sleeve 21 is positioned within the shell to abut the shoulder 18. The clamping section 19 of the shell is provided with one or more longitudinal extending slots 32. The slots 32 extend from the inner end of the shell 16 to a position adjacent the shoulder 18.

Figure 2:
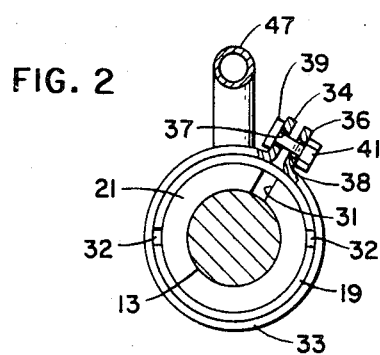
FIG. 2 is a sectional view taken along line 2—2 of FIG. 1 showing a clamp for securing the exhausting facilities to the soldering iron.

In order to clamp the shell 16 and the insulating sleeve 21 to the barrel 13, a clamping device is provided in the form of a resilient band 33 constructed of material having similar properties as the shell 16 (e.g., stainless steel). The band 33 terminates in a pair of radially extending ears 34 and 36, see FIGS. 1 and 2. The ears are spaced apart a small distance and are provided with a pair of aligned apertures 37 ad 38. The clamping band is slipped over a clamping section 19 of the shell and a headed screw 39 is passed through the apertures. A nut 41 is threaded onto the screw and tightened, thus drawing the ears together and forcing the band about the clamping section 19. Inasmuch as the clamping section is slotted, it will move inwardly to compress the sleeve 21 against the barrel 13 to firmly hold the sleeve and shell in place. It will be noted from FIG. 2 that the ears are positioned to be offset from the stainless steel tube 47. This offset relation is provided to preclude any heat transfer between these elements. In a modified version, a section of the clamping band is bonded to a section of clamping section 19 between a pair of adjacent slots 32.

In order to extract fumes, the hood 17 is formed with an oblong opening 46. Secured about the opening is an end section of a thermal conducting tube 47 which may also be constructed of stainless steel or other good heat durable and conducting metal. The end section of the tube 47 extends in an angular direction relative to the axis of the soldering iron and then runs along an axis which is substantially parallel to the axis of the barrel 13 of the soldering iron. The tube terminates before the handle 12 is reached. There is secured to or mounted on the end of the tube a second tube 48 constructed of a transparent non-heat conducting plastic material. This flexible tube 48 may be manufactured from a vinyl plastic such as Tygon-TM plastic which is obtainable from Norton Plastics and Synthetics Division, Akron, Ohio.

The tube 48 runs to a filter which, in turn, is included in an entrance to a vacuum pump. When vacuum is impressed on the tubes 48 and 47, the chamber within the hood 17 experiences a drop in pressure to withdraw air contaminants including fumes and smoke that may be produced by the heated soldering tip contacting the flux and solder during a soldering operation. The vacuum applied must be set at a level to withdraw the fumes without drawing the molten solder.

During a soldering operation, fumes from the soldering site are drawn into the hood 17 along with a significant amount of the ambient atmosphere so that the heated fumes, gases and vapors are significantly cooled. Further, as the fumes and ambient air mixture pass through the stainless steel tube 47, there is a further cooling due to the conduction of heat through the walls of the thermally conducting tube. The flexible tubing 48 is constructed of material that is not a particularly good heat conductor, thus, the hot fume-air mixture is passed to the vacuum pump. With the construction shown and described, the temperature of the fume-air mixture passing through the tubing 18 is below that which would heat the outside of the tubing to such an extent as to cause a burn if contacted by any part of the operator's body. The temperature of the fume-air mixture is maintained at a sufficient level to minimize the condensation and agglomeration of the flux material thus avoiding or limiting deposits on the wall of the tubing 48. Inasmuch as the tubing 48 is constructed of a material that is transparent, the using operator may visually inspect the tubing to detect any buildup of deposits that would block the application of vacuum to the hood 17. If significant deposits are noted, the tube 48 may be easily replaced by slipping the end of the tube 48 from the end of tube 47, and replacing it with a new section of tube.

Figure 5:
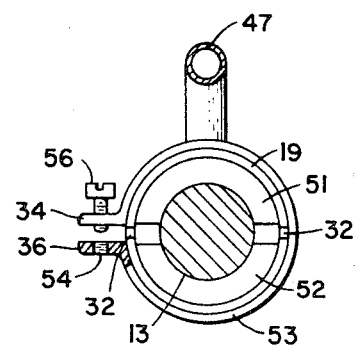
FIG. 5 is a cross-sectional view illustrating a further modified embodiment of the invention.

An alternative embodiment of the invention is shown in FIG. 5 wherein the clamping section 19 of the shell encircles a pair of semi-circular segments 51 and 52 of insulating material. In this instance, the segments may be quite rigid and may be constructed of a high density alumina silicate which is molded or machined into the desired segmental shapes. In this embodiment one ear 36 is modified by the formation of threads 54 to receive a headed screw 56. When the segments 51 and 52 and the shell 16 are assembled on the barrel 13, the screw 56 is turned in the threaded hole 54 to move the clamping ring 53 inwardly to compress the clamping section 19 to force the segments 51 and 52 into firm engagement with the barrel 13.

In summary, it should be noted that a simple lightweight attachment is provided to readily remove rosin or other objectionable fumes from a soldering site which are cooled and passed to a flexible hose. The selection of the material of the insulating sleeve is made to insure that no additional irritants are introduced into the vacuum line, such as would be the case if the sleeve was constructed of asbestos or other materials that flake or give off additional objectionable fumes. The use of the modified soldering iron eliminates the need for more expensive exhaust hood arrangements which interfere with the operation of a factory heating and air conditioning system.

What is claimed is:

1. In combination with a soldering iron having a handle, an elongated heated barrel extending from the handle and a soldering tip axially projecting from the end of said barrel, a fume exhausting device comprising:
    a shell of heat conducting material positioned coaxially of the barrel and having a first end section thereof extending about the tip of the soldering iron, said first end section having a hole formed therein which is located to overlay the tip, the second end of said shell being positioned about said barrel and having at least one slot formed therein;
    a sleeve of compressible thermal insulating material positioned within the second end of the shell and interposed between the shell and the barrel of the soldering iron for thermally insulating the shell from the heated barrel;
    a band of flexible material positioned about the slotted second end of the shell;
    means tightening the band to collapse the slotted end of the shell and compress the insulating sleeve against the barrel and hold the shell in position; and
    means extending from said hole for exhausting vapors from about the tip.

2. A fume exhausting attachment as defined in claim 1, wherein the first end section is formed with a first diameter and said second end section is formed with a second diameter larger than said first diameter to provide a shoulder section interconnecting said first and second end sections, and said sleeve is seated within said second section to rest upon said shoulder section.

3. In combination with a soldering iron having a handle, an elongated heated barrel extending from the handle and a soldering tip axially projecting from the end of said barrel, a fume exhausting device comprising:
    a collar constructed of compressible thermal insulating material surrounding a forward end section of the barrel;
    a shell constructed of heat conductive material having a first end section encasing said collar and thermally insulated by the collar from the barrel and a second end section projecting over a portion of the axially extending tip to provide a chamber about the tip, said second section being provided with a hole extending therethrough to said chamber;
    a tube constructed of heat conductive material secured to the second section of the shell about said hole and extending angularly away from said second section and then extending in spaced, parallel relation to said barrel, said tube terminating at a position alongside the barrel and spaced from said handle;
    said shell having at least one longitudinal slot extending along said first section of the shell;
    means applying a clamping force to said first section for collapsing said first section about the collar and compressing said thermal insulating collar against the forward end section of the barrel; and
    a flexible tube of non-heat conductive material connected to the end of said heat conductive tube adapted to apply vacuum through said tube to said chamber whereby heated fumes are withdrawn from the chambers and passed through said tube at temperatures so that the tube is not heated to such an extent to cause heat injuries to a using operator.

4. A fume exhausting attachment as defined in claim 3, wherein said collar of thermal insulating material is constructed from a compressible woven mat of alumina silicate fibers.

5. In combination with a soldering iron having a handle, an elongated heated barrel extending from the handle and a soldering tip axially projecting from the end of said barrel, a fume exhausting device comprising:
    a cylindrical shell of heat conducting metal having a forward hood section connected through a shoulder to a rearward clamping section having at least one longitudinally extending slot;
    a sleeve formed of compressible heat insulating material and positioned within said clamping section to abut said shoulder of said shell, said sleeve having an outer diameter approximating the inner diameter of the clamping section of the shell and an inner diameter approximating the outer diameter of the heated barrel on which the sleeve is mounted, said sleeve acting to thermally insulate said shell from the heated barrel;
    a clamp including a band surrounding the clamping section of the shell and means for drawing the band about the shell clamping section to compress the clamping section against the compressible sleeve, said sleeve being fitted and compressed about a forward section of the barrel of the soldering iron with the shoulder of the shell overlaying the end of the barrel to position the hood section about the axially projecting soldering tip;
    said hood of the sleeve being provided with a hole positioned over the soldering tip when the shell is clamped to a soldering iron;
    a heat conducting metal tube connected about said hole and running parallel to the barrel of the soldering iron and terminating before reaching the handle; and
    a heat insulating tube constructed of transparent plastic coupled at one end to said metal tube and connected to the other end to a source of vacuum that is effective to apply vacuum to the hood to withdraw heated fumes without withdrawing solder from a soldering site engaged by the soldering tip whereby the fumes are drawn through said tube adjacent to said handle at temperatures that will not inflict a burning injury to a using operator.

* * * * *